(12) United States Patent
Hatakenaka (10) Patent No.: US 7,213,089 B2
(45) Date of Patent: May 1, 2007

(54) SYSTEM AND METHOD FOR DISPLAYING A PREVIEW INDICATING A TIME-BASED ADJUSTMENT OF IMAGE DATA OR SOUND DATA

(75) Inventor: Akihiro Hatakenaka, Inagi (JP)

(73) Assignee: Fujitsu Limited, Kawasaki (JP)

( * ) Notice: Subject to any disclaimer, the term of this patent is extended or adjusted under 35 U.S.C. 154(b) by 227 days.

(21) Appl. No.: 10/676,028

(22) Filed: Oct. 2, 2003

(65) Prior Publication Data

US 2004/0066396 A1    Apr. 8, 2004

Related U.S. Application Data

(63) Continuation of application No. PCT/JP01/02955, filed on Apr. 5, 2001, now abandoned.

(51) Int. Cl.
  *G06F 3/00*    (2006.01)
  *H04N 5/262*    (2006.01)
  *G09G 5/00*    (2006.01)

(52) U.S. Cl. .............. 710/65; 710/5; 710/73; 345/716; 345/723; 386/52; 386/55; 386/64; 348/722; 348/239

(58) Field of Classification Search .............. 710/5, 710/65, 73; 386/52, 55, 64; 715/723; 348/722, 348/239; 345/716, 723
See application file for complete search history.

(56) References Cited

U.S. PATENT DOCUMENTS 5,956,453 A    9/1999 Yaegashi et al.
6,115,037 A    9/2000 Sumiyoshi et al.
6,144,391 A *  11/2000 Hinson et al. .............. 345/540
6,154,601 A    11/2000 Yaegashi et al.
6,236,802 B1 * 5/2001 Yamamoto ................... 386/52
6,353,461 B1 * 3/2002 Shore et al. ................ 348/722
6,618,058 B1 * 9/2003 Yasui ......................... 715/723
6,744,968 B1 * 6/2004 Imai et al. ................... 386/52

FOREIGN PATENT DOCUMENTS

| EP | 0 843 311 A2 | 11/1997 |
| JP | 63-085978 | 4/1988 |
| JP | 6-149829 | 5/1994 |
| JP | 10-134202 | 5/1998 |
| JP | 10-200814 | 7/1998 |
| JP | 10-200855 | 7/1998 |
| JP | 11-32304 | 2/1999 |
| JP | 2000-020749 | 1/2000 |
| JP | 2000-137832 | 5/2000 |

OTHER PUBLICATIONS

International Search Report.
International Preliminary Examination Report.

* cited by examiner

*Primary Examiner*—Tammara Peyton
(74) *Attorney, Agent, or Firm*—Staas & Halsey LLP (57) ABSTRACT

An information processing device for setting a parameter about objective data, comprising an output unit for outputting the objective data, an operation unit for detecting an instruction of a user, an output control unit for altering the parameter value with time in order and instructing the output unit to output the objective data the parameter value of which is set, and a processing unit for defining the parameter value when the instruction is detected as the parameter value about the objective data.

29 Claims, 11 Drawing Sheets

SYSTEM AND METHOD FOR DISPLAYING A PREVIEW INDICATING A TIME-BASED ADJUSTMENT OF IMAGE DATA OR SOUND DATA

This is a continuation of Application PCT/JP01/02955, filed on Apr. 5, 2001, now abandoned.

BACKGROUND OF THE INVENTION

1. Technical Field

The present invention relates to a technology of processing parameters for adjusting a visual effect on still image data and an effect on a sound.

2. Background Arts

This type of technology is exemplified such as a filtering process and an effect process on image data and sound data. Herein, the filtering process connotes a process of filtering, such as smoothing, etc., the still image data and the sound data.

Further, the effect process connotes a process of setting parameters, such as brightness of the image, a contrast thereof, a color, etc., for designating visual effects on the image data. Moreover, the effect process on the sound is exemplified such as a process of adjusting a reverberation effect, and so on.

Hereinafter, the effect process includes the filtering process given above and implies a general category of process of processing the image and the sound in accordance with the parameters. The present invention relates to a user interface (UI) in a system for setting the parameters described above.

According to the prior arts, when executing the effect process on the still image, to start with, the parameter is designated. Then, for confirming a post-processing result, the image is previewed in many cases.

In the effect process, etc., a content of the image as a result of processing differs depending on a value of the parameter. Setting such a parameter to a value desired by a user involves providing a numerical-value-based parameter designating function or scroll-control and sliderwise-control parameter setting functions. Then, it is a general practice that the parameter value is directly inputted, or the parameter is set under control while displaying a degree of the effect so as to be previewed. Herein, the control is defined as a component that can be laid out on the computer screen and provides the user interface.

The conventional parameter designating method was, however, hard to establish a compatibility between a highly-accurate designation and an intuitive input technique. The input of the numerical value has a characteristic of directly designating its value and is therefore capable of designating the highly-accurate parameter value.

If this value is incremented or decremented, however, it is required for confirming how much there is a change in the effect that the value be inputted each time, and the preview and the auditory trial be performed. As a result, these procedures make the user hard to intuitively grasp a relationship between the parameter value and the effect.

On the other hand, there is a method of intuitively designating the value by utilizing the scroll-control. According to this method, however, a visible width of the control itself indicates a range of the values.

Then, on the user interface screen that generally has a limited space, a sufficient control width can not be ensured. As a consequence, there occurs such a phenomenon that one unit of the operation in the scroll-control is equivalent to a unitage of several tens in value.

Accordingly, there might be a case where the highly-accurate input is difficult to perform under the control described above. Further, even if one unit of the control is coincident with a minimum unit in value, when scrolling by a dragging process using a pointing device, a minute shake in hand often makes it difficult to input with a high accuracy.

Moreover, there is also know a user interface that combines the value designation with the scroll-control. Even in the case of utilizing this type of user interface, it is a timing of inputting the value that there appears a variation in effect which depends on an increment and a decrement in value.

Therefore, when the operator increments or decrements the parameter value, there is needed a step of changing the value each time in order to confirm a visual effect and a sound effect. Such a manual input of the operator causes a scatter in timing of designating. It is therefore difficult to exactly conform a degree of transition of the effect in relation to a quantity of variation in value.

SUMMARY OF THE INVENTION

The present invention provides, before actually executing the effect process, etc. described above, a function of previewing an image as a result of processing and a function of listening processed sound data on trial. The present invention further provides a function enabling a user to determine a proper value of each of various categories of parameters intuitively and simply.

Namely, the present invention puts an emphasis on a preview display of a still image effect. According to the present invention, the preview exhibiting the time-based variations in effect is replayed as an animation. With this contrivance, the present invention makes it possible to designate the parameter value with a high accuracy.

Further, the present invention puts an emphasis on the function of listening the sound on trial. The present invention makes it feasible to designate the parameter value with the high accuracy by replaying the sound exhibiting the time-based variations in effect.

According to the present invention, an information processing system setting a parameter related to target data, comprises an output unit outputting the target data, an operation unit detecting a user's indication, an output control unit changing a parameter value sequentially as the time elapses and outputting the target data with the parameter value set from the output unit, and a processing unit establishing the parameter value when detecting the user's indication as a parameter value related to the target data.

Preferably, the information processing system may further comprise a speed designating unit designating a speed of changing the parameter value.

Preferably, the output control unit may linearly change the parameter value.

Preferably, the information processing system may further comprise a range specifying unit inputting an initial value and an end value that between which the parameter value is changed.

Preferably, the output unit may simplify and may thus output the target data, and the output control unit may have the simplified target data outputted based on the parameter value that is to be changed.

The target data may be image data. Further, the target data may also be sound data.

According to the present invention, an information processing method setting a parameter related to target data, comprises changing a parameter value sequentially as the time elapses and outputting the target data with the parameter value set, detecting a user's indication, and establishing the parameter value when detecting the user's indication as a parameter value related to the target data.

There is also provided a program that makes a computer actualize any one of the functions described above. Further, there is provided a readable-by-computer recording medium recorded with such a program.

According to the present invention, the parameters for still image data and sound data are changed in time-series. Then, a result thereof is previewed as an animation or outputted for listening on trial.

Thus, the result of changing the parameter can be intuitively grasped. Moreover, an operator designates a timing at which an optimal image is displayed while seeing the preview automatically displayed as the animation, there by setting a value thereof. This schemes eliminates a labor for designating the value itself.

Namely, according to the present invention, a degree of changing the effect based on the change in parameter value is expressed in a state where a visual continuation linearity are kept. As a result, the user can intuitively grasp the result of the effect.

Further, as for the sound data, the operator designates a timing at which the optimal sound is replayed while listening to the sound replayed in continuation, thereby setting a value thereof.

Namely, according to the present invention, the degree of changing the effect based on the change in parameter value is expressed in the state where an acoustic continuation linearity are kept. As a result, the user can intuitively grasp the result of the effect process.

Moreover, according to the present invention, the user enables the operator to designate the animation replay time, whereby a compatibility between an accuracy of selecting the parameter value and the intuitive operability can be attained.

Further, according to the present invention, the user can designate a start position and an end position that make the animation effect with respect to the target parameter.

As explained above, according to the present invention, the parameters for the image and the sound can be designated accurately and intuitively.

DETAILED DESCRIPTION OF THE PREFERRED EMBODIMENTS

Preferred embodiments of the present invention will hereinafter be described with reference to the drawings.

<<First Embodiment>>

An information processing system in a first embodiment of the present invention will hereinafter be described with reference to FIGS. 1 through 3.

<Hardware Architecture>

Figure 1:
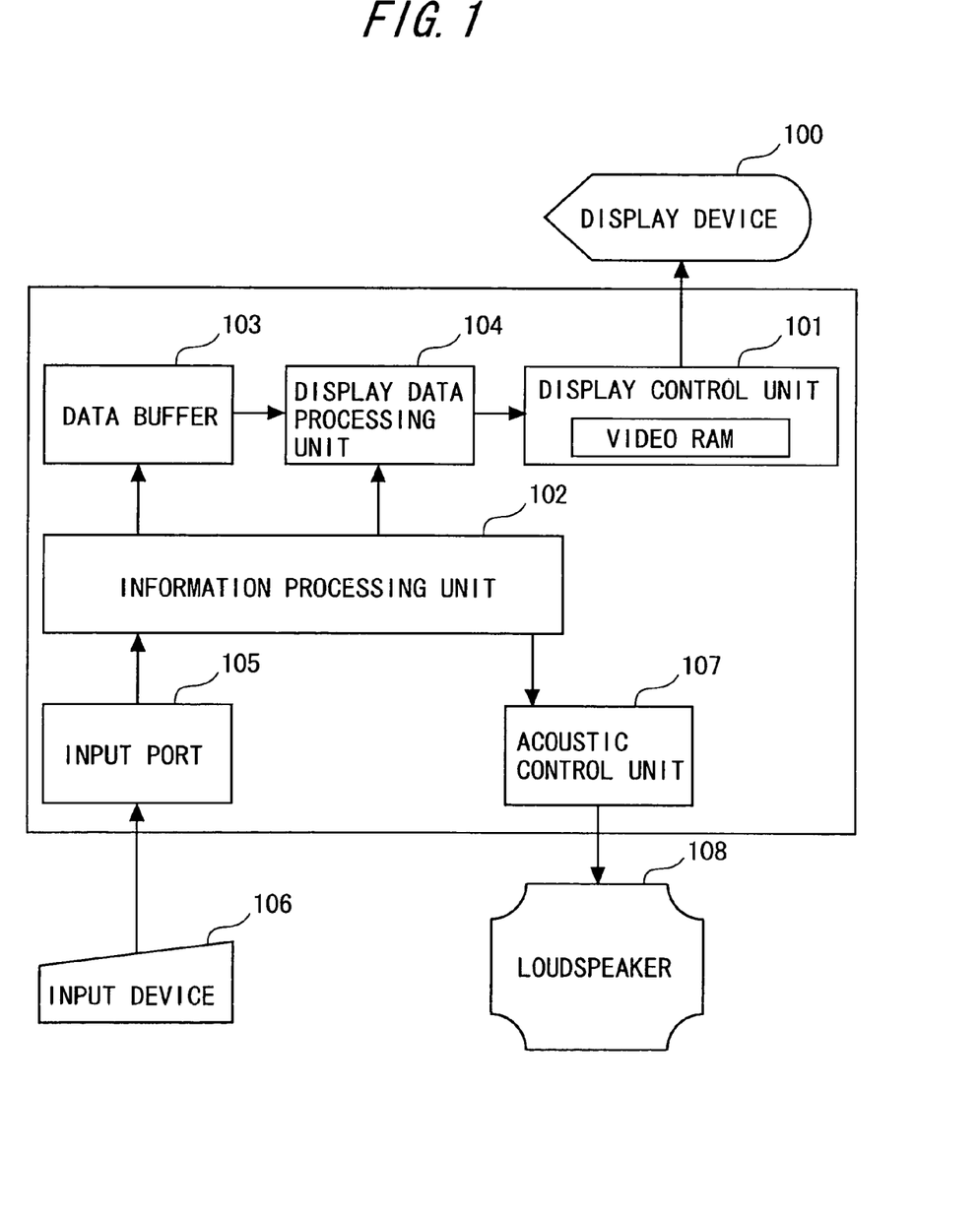
FIG. 1 is a diagram showing a hardware architecture of an information processing system.

FIG. 1 shows a diagram of a hardware architecture of the present information processing system. This information processing system includes an information processing unit 102 for providing a function as the information processing system by executing a program, an input device 106 for detecting an user's operation and inputting a command of the user to the information processing unit 102, an input port 105 for connecting the input device 106 to the information processing unit 102, a data buffer 103 for storing data processed by the information processing unit 102, a display data processing unit 104 for processing the data in the data buffer 103 in accordance with a command given from the information processing unit 102, a display device 100 for displaying the data processed by the display data processing unit 104, a display control unit 101 for controlling the display device 100, a loudspeaker for outputting sounds, and an acoustic control unit 107 for generating sound signals from sound data on the basis of a command given from the information processing unit 102 and transferring the sound signals to the loudspeaker 108.

The information processing unit 102 is constructed of, e.g., a microprocessor. The information processing unit 102 executes the program, thereby providing the function as the information processing system.

The input device 106 is, for example, a keyboard, a pointing device, etc. Further, the pointing device is one of a mouse, a trackball, a stick type pointing device, an electro-static touch pad, a touch panel, etc. The user inputs a variety of commands to the information processing unit 102 by manipulating the input device 106.

The data buffer 103 is constructed of a memory. The data buffer 103 is used as an operation area for the information processing unit 102. Further, the data buffer 103 temporarily stores (buffers) the information made to displayed on the display device 100 by the information processing unit.

The display data processing unit 104 is a so-called video chip and processes the information to be displayed on the display device 100 in accordance with a command from the information processing unit 102. Herein, the processing connotes executing, for instance, a filtering process for the image data, a change in brightness, a change in contrast, and so on.

The display device 100 is, e.g., a CRT, a liquid crystal display device, a plasma display panel, an electro-luminescence panel, etc. The display device 100 displays the information outputted from the information processing unit 102.

The display control unit 101 is, for example, a CRT controller, an LCD controller/driver, and so forth. The display control unit 101 includes a video RAM and controls displaying on the display device 100. This display control unit 101 corresponds to an output control unit.

The acoustic control unit 107 converts the sound data into sound signals on the basis of a command given from the information processing unit 102, and has the sound emitted from the loudspeaker 108. At this time, the acoustic control unit 107 executes the filtering process on, adding a reverberation effect and so forth to the sound data in accordance with a command from the information processing unit 102. This acoustic control unit 107 also corresponds to the output control unit.

<Example of Operation>

Figure 2:
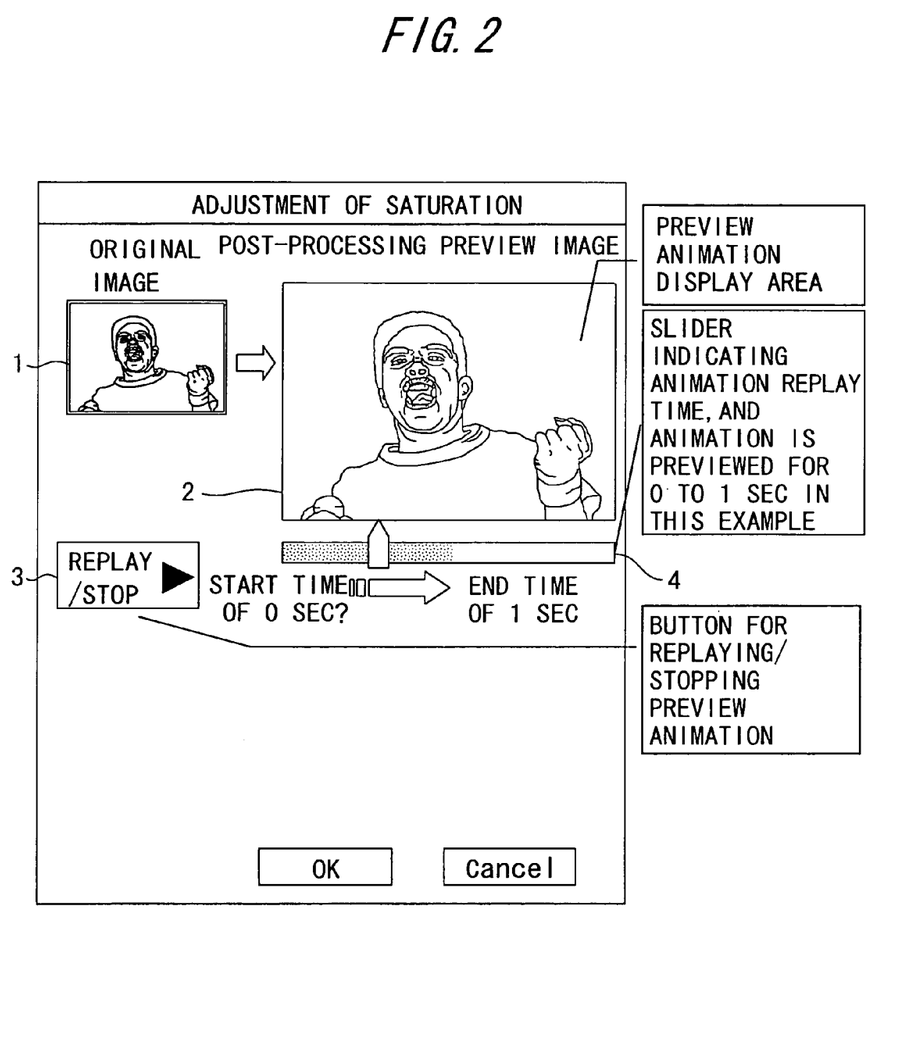
FIG. 2 is a diagram showing an operational example of setting a parameter for image data in a first embodiment.

FIG. 2 shows an operation screen in the present information processing system. This operation screen is displayed on the display device 100 in accordance with a command of the information processing unit 102. The user sets image parameters on this operation screen by manipulating the input device 106. Further, the user confirms a result of an effect process on this operation screen.

The user is able to set the variety of parameters on this operation screen. FIG. 2, however, shows the screen when adjusting a saturation.

This screen contains an original image display box 1, a preview display box 2, a replay/stop button 3, a slider 4, an OK button and a cancel button.

An original image as an effect processing target is displayed in the original image display box 1. A post-effect-processing image is displayed in the preview display box 2. According to the present information processing system, the parameter, e.g., the saturation is changed step wise in time and thus displayed in the preview display box 2. Herein, the time-based changing display of the parameter is called an animation.

The slider 4 has an indicator for indicating a state of progress of the animation. The slider 4 moves the indicator from a left end (which is a position indicating "start time of 0 sec") to a right end (which is a position indicating "end time of 1 sec" as the animation progresses. With this contrivance, the slider 4 indicates a replay time (which is an elapsed time since the start of the animation) of the animation.

The replay/stop button 3 detects a command of starting the animation and a command of stopping the animation. Namely, when the user presses the replay/stop button 3, the animation is displayed in the preview display box 2. The replay/stop button 3 in the case of starting the animation is referred to as a replay button.

Moreover, when the user presses the replay/stop button 3 during the replay of the animation, the animation stops. The replay/stop button 3 in the case of stopping the animation is referred to as a stop button.

When the stop button is pressed, the information processing unit 102 retains a parameter for designating an image effect just at the stop of the animation. With this scheme, the user selects the parameter just when producing a desired effect in the process of time-based variations of the image effect.

The selected parameter is saved by pressing the OK button, and the operation screen in FIG. 2 is terminated. Further, the selected parameter is discarded by pressing the cancel button, and the operation screen in FIG. 2 is terminated.

<Operation and Effect>

Figure 3:
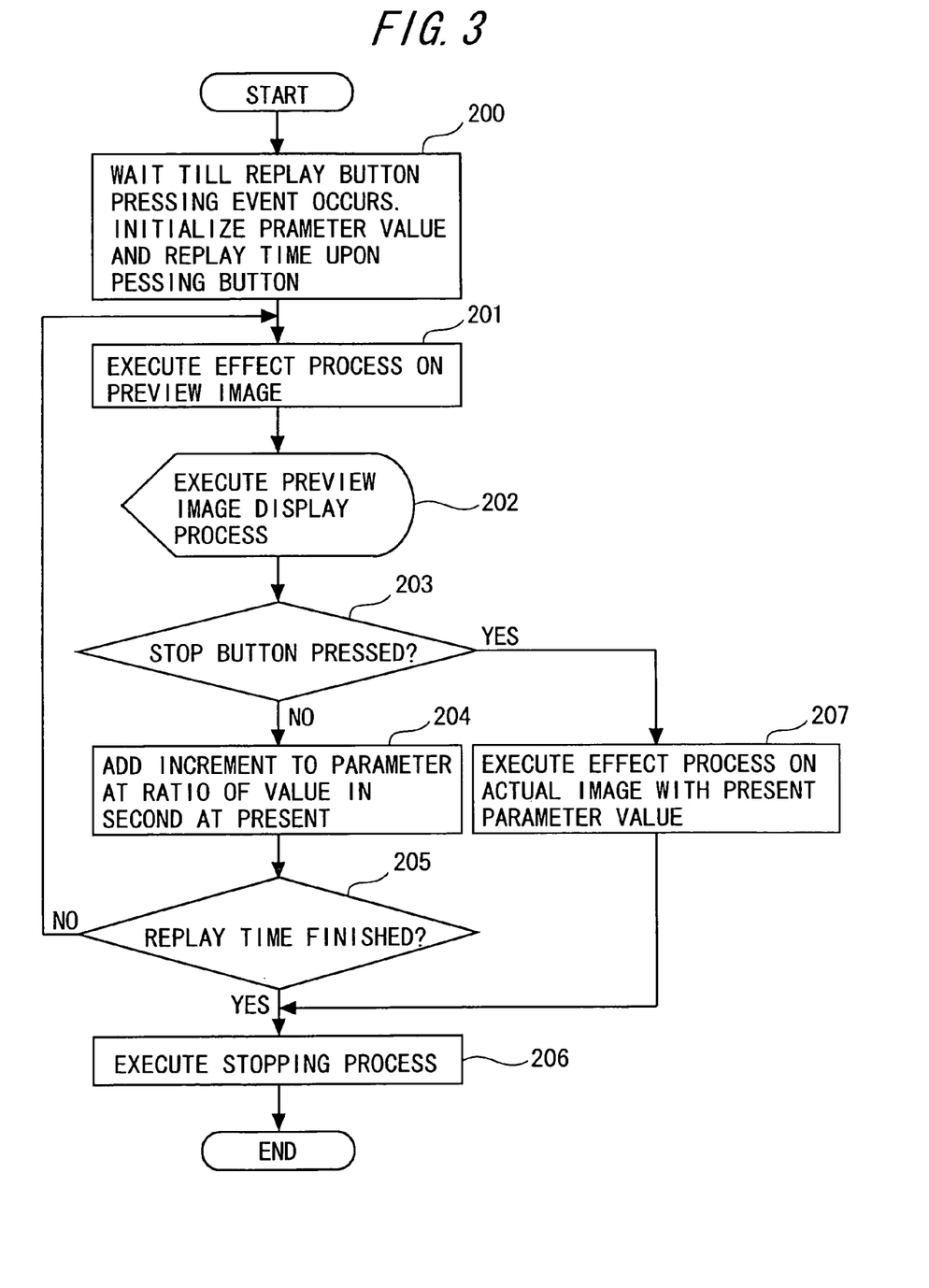
FIG. 3 is a flowchart showing a parameter setting process in the information processing system in the first embodiment.

FIG. 3 shows a parameter setting process executed in the present information processing system. In this process, to begin with, the information processing unit 102 waits till an event of pressing the replay button (replay/stop button 3) occurs. Then, the pressing event occurs upon pressing the replay button, the information processing unit 102 initializes a parameter value and a value of the replay time as well (step 200).

Note that in the initial state where a processing target original image is designated and the operation screen is displayed, the original image designated is transferred to the data buffer 103 and displayed in the original display box 1, and the display data processing unit 104 gets this original image displayed in the preview display box 2 without changing the parameter value.

A scheme in the first embodiment is that the parameter value or a degree of effect is expressed in values of "0" to "255", and the parameter value of the original image is set to 128 as an intermediate value among these values. Then, a parameter value obtained by subtracting a predetermined value from the parameter value of the original image is set to a value "0" (the minimum value, the initial value), and a parameter value obtained by adding the predetermined value to the parameter value of the original image is set to a value "255" (the maximum value).

As discussed above, when displaying the original image in the preview display box 2, the indicator is displayed in the middle position of the slider 4. Note that the same processes as the above are executed also in other embodiments which will hereinafter be explained.

Hence, in the example of adjusting the saturation in FIG. 2, if the value is smaller than 128, the saturation is smaller than that of the original image, whereas if the value is greater than 128, the saturation is larger than that of the original image.

Note that an increment in the parameter value, which will hereinafter be described, is determined based on a time (a replay time) expended in changing the parameter from the minimum value to the maximum value, a difference between the maximum value and the minimum value and a time expended in a processing loop where the respective are executed round.

In any image, however, if there is fixed a range of values that the parameter relative to this image can take, it is sought which value in this range the parameter relative to the original image takes, then the indicator is displayed in a position, corresponding to this value, of the slider 4, and the replay may be transited from the minimum value to the maximum value in the value range thereof.

Next, the information processing unit 102 executes, based on the present parameter value, the effect process for the preview image (step 201). For instance, the saturation, etc. of the preview image is thereby set to the parameter value described above, and the display data processing unit 104 processes the image on the basis of the parameter.

Subsequently, the post-processing preview image is transferred to the video RAM of the display control unit 101 from the display data processing unit 104. The display control unit 101 displays the preview image on the preview display box 2 on the operation screen of the display device 100 (step 202).

Next, the information processing unit 102 judges whether or not there occurs the event of pressing the stop button (the replay/stop button 3) (step 203). If the stop button is not pressed, the information processing unit 102 calculates an increment in parameter value from an elapsed time till the present time since the start of the replay. Then, the information processing unit 102 adds the increment to the present parameter value (step 204).

Ensuingly, the information processing unit 102 judges whether the replay time terminates or not (step 205). If the replay time does not yet terminate, the information processing unit 102 returns the control to the effect process on the preview image (step 201). Further, if the replay time terminates, the information processing unit 102 executes as topping process (step 206).

On the other hand, when judging in step 203 that the stop button is pressed, the information processing unit 102 executes the effect process on the image in accordance with the present parameter value (S207).

In this process, the effect process is executed on the actual image in a way that refers to the parameter value applied to the preview image. Thereafter, the information processing unit 102 executes the stopping process (step 206).

In the stopping process, when the user presses the OK button, the information processing unit 102 saves the parameter concerned and finishes the parameter setting process. Moreover, when the user presses the cancel button, the information processing unit 102 discards the above parameter and finishes the parameter setting process.

As discussed above, according to the present information processing system, the result of the effect process on the preview image is displayed in the form of the animation in the preview display box 2. The user may simply press the stop button at an optimal point of time of the effect in the animation of the preview image displayed therein.

With this scheme, the user can designate the parameter value without being aware of the numerical value itself. Further, the user becomes easier to take an overview of the transition of the effect in the range of the minimum through maximum values of the parameter and to imagine before-and-after states thereof. As a result, the effect can be previewed in a intuitive sense of operation, and the parameter can be thus set.

<Modified Example>

In the processes shown in FIG. 3, the stopping process occurs when the replay time comes to an end, however, a scheme is not that this stopping process is terminated, but that the processes in steps 201 through 205 may be repeatedly executed by initializing the parameter value.

In this case, this process can be terminated by pressing the stop button, and, if the changed parameter value is desired not to be set, the cancel button may be pressed after pressing the stop button.

The discussed point in the aforementioned first embodiment is the function in which the animation is generated based on the time-based variations of the effect on the preview image and is displayed in the preview display box 2, and the optimal parameter is determined by the user's operation. An image having a data size lessened by reducing the actual image data may also be utilized as a preview image displayed in this preview display box 2. Then, after the parameter value has been established, the effect process may be executed on the actual image.

<<Second Embodiment>>

A second embodiment of the present invention will hereinafter be described with reference to the drawings in FIGS. 4 through 7. The first embodiment discussed above has dealt with the information processing system in which the animation is replayed in a way that changes the parameter in time-series with respect to the preview image, the effect is previewed in the intuitive sense of operation, and the parameter is thus set.

The information processing system enabling the user to set a replay speed of the animation will be discussed in the second embodiment. Other configurations and operations are the same as those in the first embodiment. Such being the case, the same components are marked with the same numerals as those in the first embodiment, and their explanations are omitted. Further, the drawings in FIGS. 1 through 3 are referred to when the necessity arises.

<Example of Operation>

Figure 4:
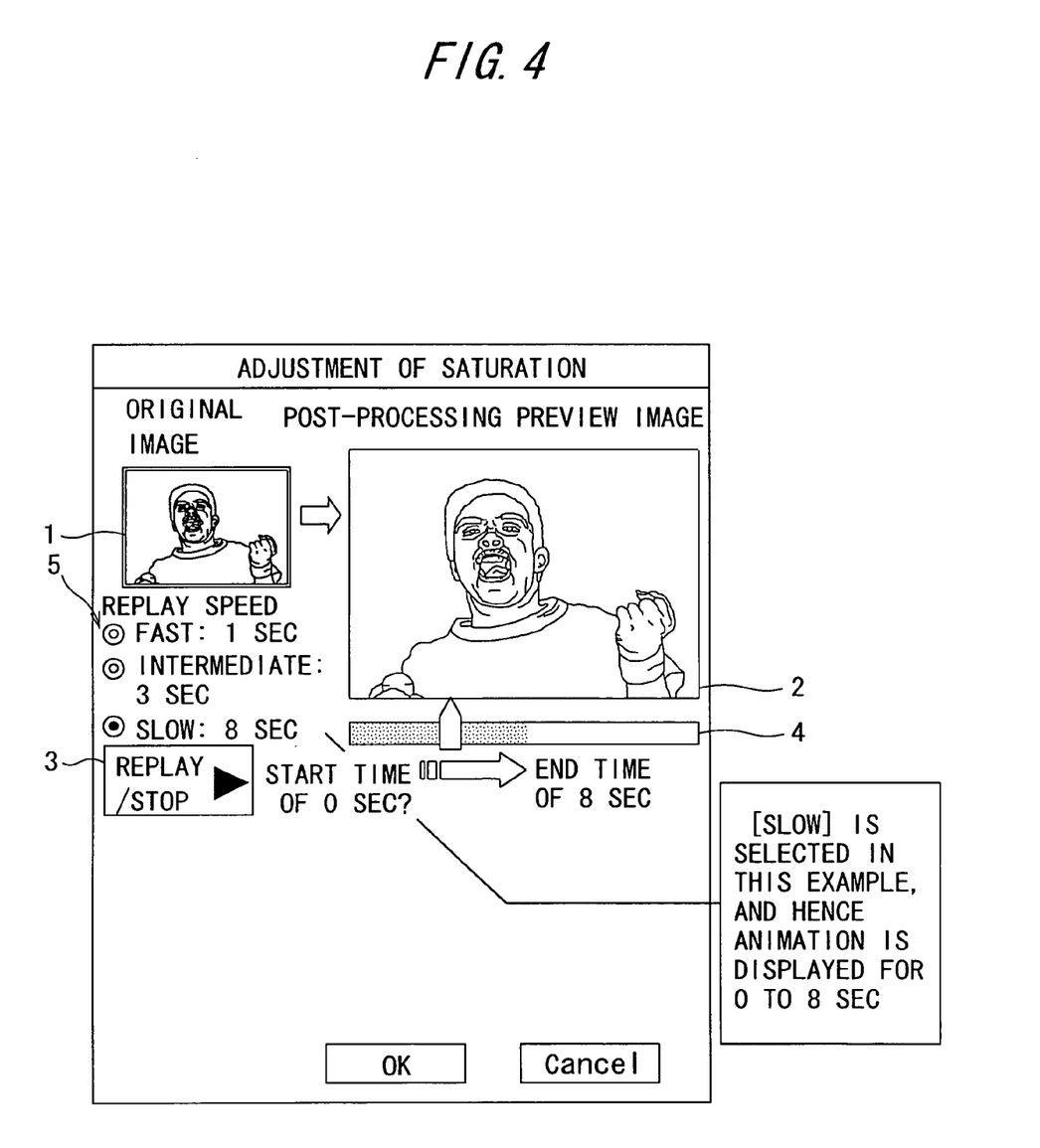
FIG. 4 is a diagram showing an operational example of designating a replay speed in a second embodiment.

FIG. 4 shows an operation screen in the present information processing system. This operation screen is different from the operation screen (FIG. 2) in the first embodiment in terms of having a reply speed setting area 5.

The replay speed setting area 5 is defined as an user interface (UI) used for the user to set a replay speed of the animation. As illustrated in FIG. 4, according to the second embodiment, the replay speed setting area 5 contains three types of options. The embodiment of the present invention is not, however, limited to the three types of options.

On the operation screen in FIG. 4, the options such as "Fast: 1 sec", "Intermediate: 3 sec" and "Slow: 8 sec" are provided by button control. In this example, the user selects "Slow: 8 sec". Therefore, when the user presses the replay button (the replay/stop button 3), the animation continues to be displayed for 8 sec.

Operation and Effect

Figure 5:
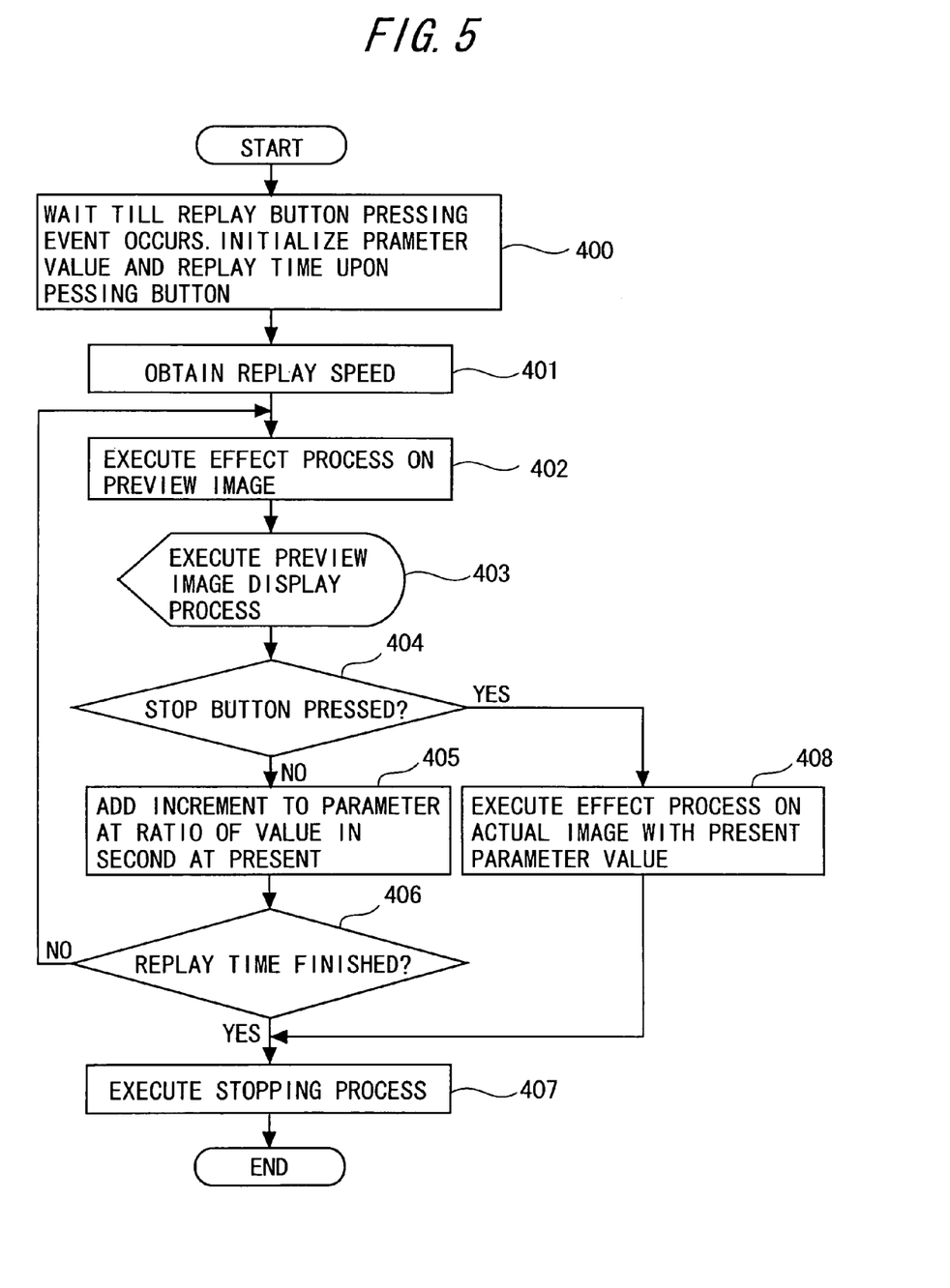
FIG. 5 is a flowchart showing a parameter setting process in the information processing system in a second embodiment.

FIG. 5 shows a parameter setting process executed in the present information processing system. According to the second embodiment, as in the first embodiment, at first, the information processing unit 102 waits till there occurs the event of pressing the replay button (the replay/stop button 3). Then, when the button pressing event occurs upon pressing the replay button, the information processing unit 102 initializes a parameter value and a value of the replay time as well (step 400).

Nest, the information processing unit 102 obtains an already-set replay speed (or a time till the replay is completed) (step 401). The present information processing system transits the parameter in time-series on the basis of this replay speed and, as in the first embodiment, replays the animation.

Processes of replaying the animation and establishing the parameter (steps 402 through 407) are the same as the processes (steps 201 through 206 in FIG. 3) in the first embodiment.

An increment added to the parameter value in step 405 differs corresponding to the replay speed. In this point, the animation replaying process in the present information processing system is different from the first embodiment.

As discussed above, according to the information processing system in the second embodiment, the user can set the replay speed for replaying the animation and establishing the parameter. Therefore, for example, if the replay time is set short, the user is able to take an overview of the minimum to the maximum of the parameter value in a short time. Further, if the replay time set long, subtle changes can be consecutively previewed. Hence, a highly accurate parameter designation can be attained.

<Modified Example>

What has been described in the aforementioned second embodiment is the information processing system enabling the user to designate the replay speed when replaying the animation by transiting the image parameter in time-series. The user may also be able to designate a range of the parameter transition described above.

Figure 6:
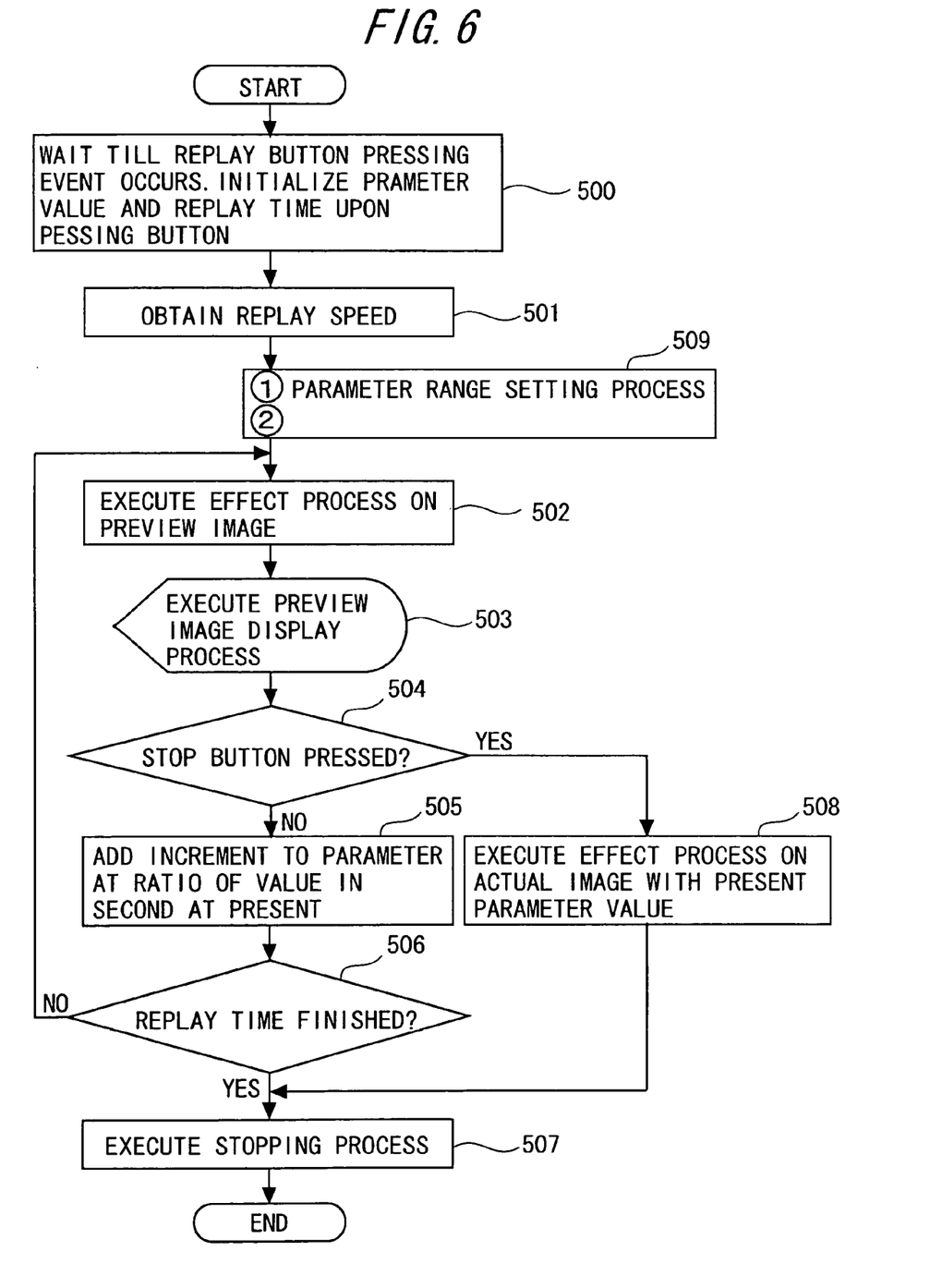
FIG. 6 is a flowchart showing a modified example (including a parameter range setting process) of the second embodiment.
Figure 7:
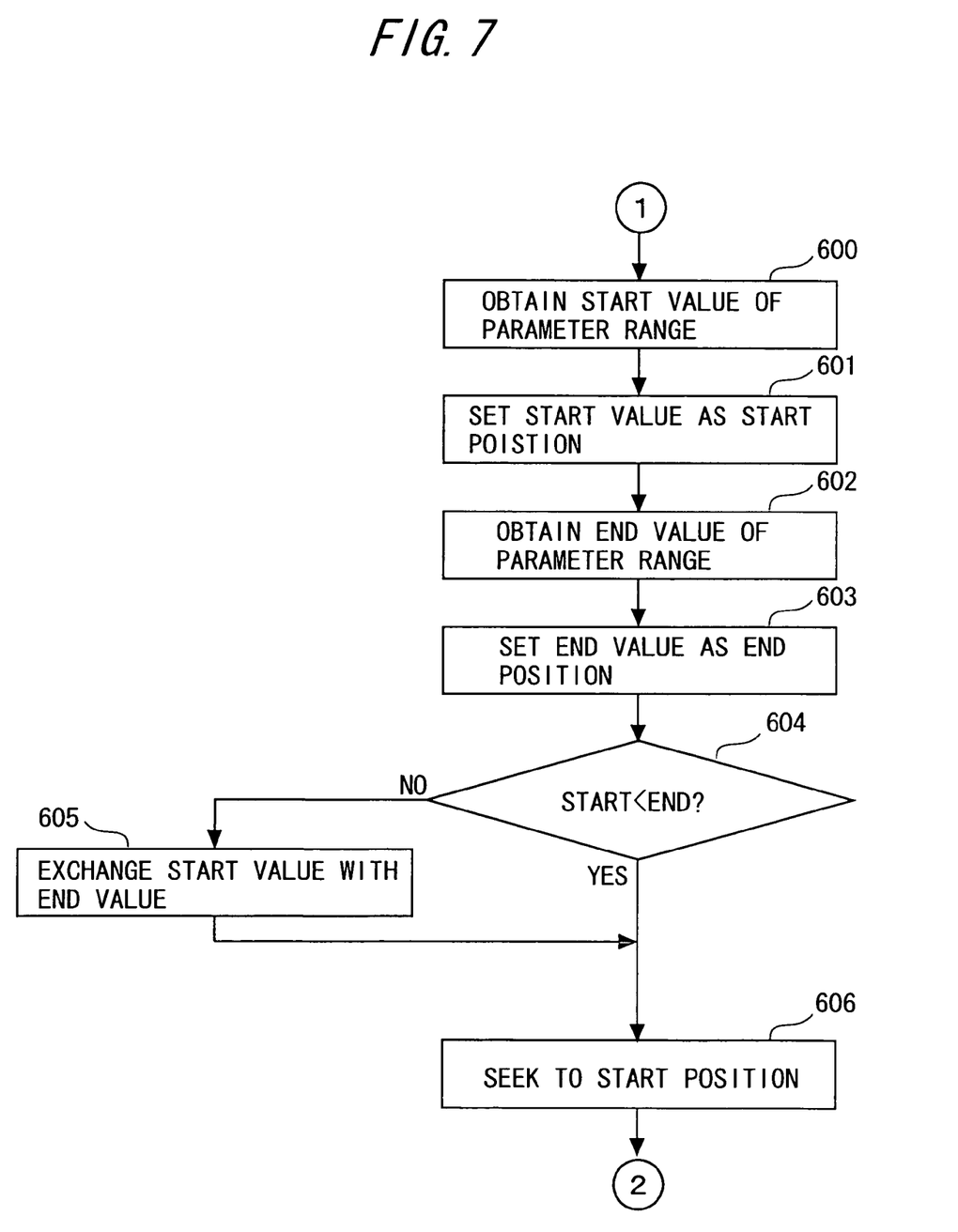
FIG. 7 is a flowchart showing the parameter range setting process in detail.

FIGS. 6 and 7 show processes by the information processing system enabling the user to set the parameter transition range, i.e., an initial value and a terminating value of the parameters in the animation. In the following discussion, the parameter transition range described above is simply called the parameter range.

FIG. 6 shows a parameter setting process in the information processing system in which the parameter range can be set. The process shown in FIG. 6 is the same as the process in FIG. 5 except such a point that a parameter range setting process (step 509) is executed.

Namely, the information processing unit 102, after acquiring the replay speed (step 501), executes the parameter range setting process (step 509). In this process, a parameter range is set. According to the present information processing system, there are executed the processes (steps 502 through 507) of making the parameter transit in the thus set parameter range, replaying the animation and establishing the parameter.

FIG. 7 shows the parameter range setting process (step 509 in FIG. 6) in detail. In this process, to begin with, the information processing unit 102 acquires a start value of the parameter range (step 600).

This start value is a parameter value desired by the user as a value for starting the replay within the parameter value available range. This start value is set by the unillustrated control on the operation screen (FIG. 4).

Next, the information processing unit 102 sets the acquired parameter start value as a replay start position (Start) (step 601).

Subsequently, the information processing unit 102 acquires an end value of the parameter range (step 602). This end value is a parameter value desired by the user as a value for ending the replay. This end value is likewise set by the unillustrated control on the operation screen (FIG. 4).

Next, the information processing unit 102 sets the thus acquired parameter end value as a replay end (End) position (step 603).

Ensuingly, the information processing unit 102 compares the start value (which is displayed as "Start" in FIG. 7) and the end value (which is expressed as "End" in FIG. 7) with each other, and checks whether the start value is smaller than the end value or not (step 604).

If the start value is not smaller than the end value, the information processing unit 102 exchanges the start value with the end value (step 605).

Next, the information processing unit 102 seeks the indicator of the slider 4 that indicates a replay position, to the start value ("Start" position) (step 606). Thereafter, the information processing unit 102 proceeds the control to step 502 (FIG. 6).

As discussed above, according to the present information processing system, the user can set the start value and the end value of the animation as the user intends. Therefore, for instance, before narrowing down the parameters, the animation with a wide range of parameter transition is executed, and an outline of the effect on the parameter value can be grasped.

Moreover, the high-accuracy setting is done after narrowing down the parameters within the desired range, the parameter can be transited within the narrow range.

<<Third Embodiment>>

A third embodiment of the present invention will be described with reference to the drawings in FIGS. 8 through 10. What has been discussed in the second embodiment is the information processing system enabling the user to set the replay speed of the animation. Further, what has been explained in the modified example of the second embodiment is the information processing system enabling the user to designate the parameter range in the animation.

The information processing system enabling the user to designate parameter ranges for plural categories of parameters is explained in the present embodiment. Other configurations and operations are the same as those in the second embodiment. Such being the case, the same components are marked with the same numerals as those in the first or second embodiment, and their explanations are omitted. Further, the drawings in FIGS. 1 through 7 are referred to when the necessity arises.

<Example of Operation>

Figure 8:
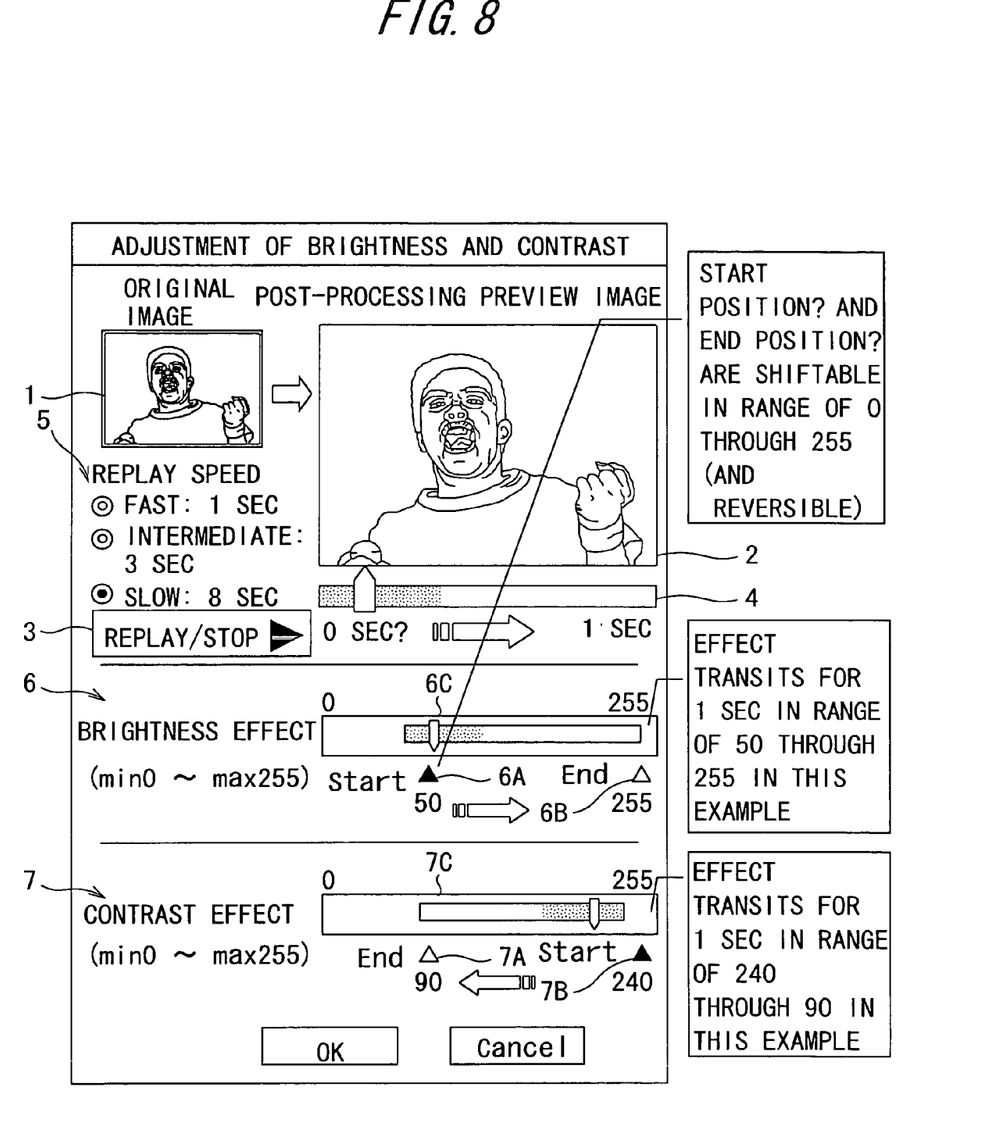
FIG. 8 is a diagram showing an operational example of designating ranges of plural categories of parameters in a third embodiment.

FIG. 8 shows an operation screen in the present information processing system. This operation screen is different from the operation screen (FIG. 4) in the information processing system according to the second embodiment in terms of having a brightness effect setting area 6 and a contrast effect setting area 7.

The brightness effect setting area 6 is defined as an user interface (UI) used for the user to set brightness of an image. As illustrated in FIG. 8, in this information processing system, the brightness effect setting area 6 contains a slider 6C for explicitly indicating a present brightness effect on the animation. The slider 6C has an indicator that moves based on the animation so as to indicate time-based variations in image brightness thereof. Further, the slider 6C includes a start point designating mark (6A) with a character "Start" and an end point designating mark (6B) with a character "End".

The start point designating mark (6A) designates a value of brightness when starting the animation, i.e., a value of a start point. The end point designating mark (6B) designates a value of brightness when ending the animation, i.e., a value of an end point. With this contrivance, the image brightness changes in a section ranging from the value of the start point to the value of the end point in the animation.

Both of the start point designating mark (6A) and the end point designating mark (6B) are capable of values in a range of 0 through 255. Moreover, the value of the start point designating mark (6A) can be set larger than the value of the end point designating mark (6B).

The contrast effect setting area 7 is defined as an user interface used for the user to set an image contrast. As shown in FIG. 8, according to the present information processing system, the contrast effect setting area 7 includes a slider 7C for explicitly a present contrast in the animation. The slider 7C has an indicator that moves based on the animation so as to indicate time-based variations in image contrast thereof. Further, the slider 7C includes a start point designating mark (7A) with a character "Start" and an end point designating mark (7B) with a character "End".

The start point designating mark (7A) designates a value of contrast when starting the animation, i.e., a value of a start point. The end point designating mark (7B) designates a value of contrast when ending the animation, i.e., a value of an end point. With this contrivance, the image contrast changes in a section ranging from the value of the start point to the value of the end point in the animation.

Both of the start point designating mark (7A) and the end point designating mark (7B) are capable of values in a range of 0 through 255. Moreover, the value of the start point designating mark (7A) can be set greater than the value of the end point designating mark (7B).

In the example in FIG. 8, "Fast: 1 sec" is set in the replay speed, "50" is set in the brightness start point designating mark (6A), "255" is set in the end point designating mark (6B), "240" is set in the contrast start point designating mark (7A), and "90" is set in the contrast end point designating mark (7B). Accordingly, the brightness changes in a range of 50 to 255 in a 1-sec animation. Further, during this period, the contrast changes in a range of 240 to 90.

<Operation and Effect>

Figure 9:
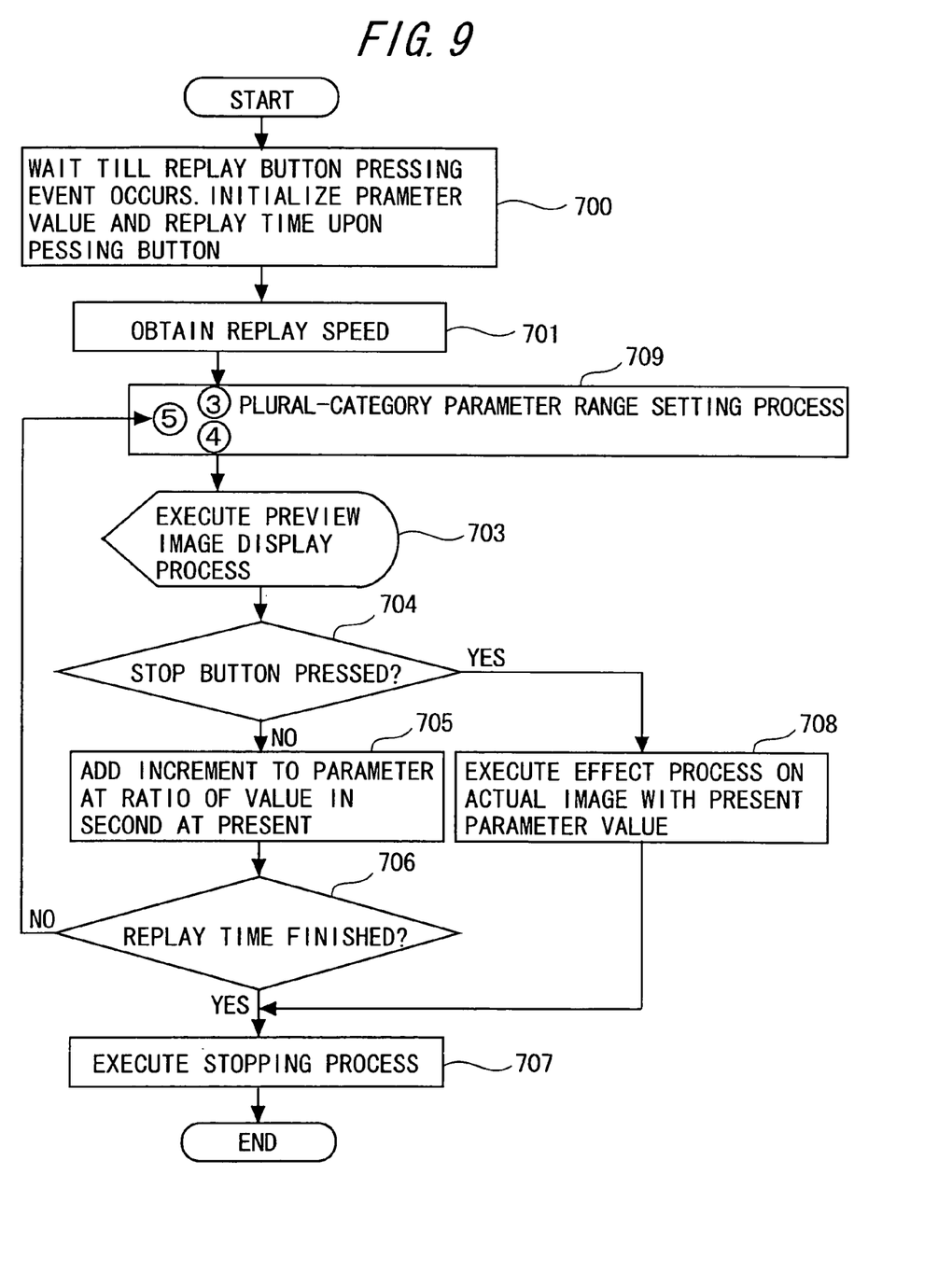
FIG. 9 is a flowchart showing a parameter setting process in the information processing system in a third embodiment.

FIG. 9 shows a parameter setting process executed in the present information processing system. The process shown in FIG. 9 is substantially the same as in the second embodiment (FIG. 5) except such points that the plural-category parameter range setting process (step 709) is added and that the effect process (step 402 in FIG. 5) on the preview image is deleted.

To be specific, the information processing unit 102, after acquiring a replay speed (step 701), executes the plural-category parameter range setting process (step 709). In this process, parameter ranges of plural categories of parameters are set. In this point, the processes by the present information processing system are different from the modified example (FIG. 6) of the second embodiment.

In the present information processing system, the plural categories of parameters transit in the thus set parameter ranges, then the animation is replayed, and processes of establishing the parameters are executed (steps 703 through 707).

Figure 10:
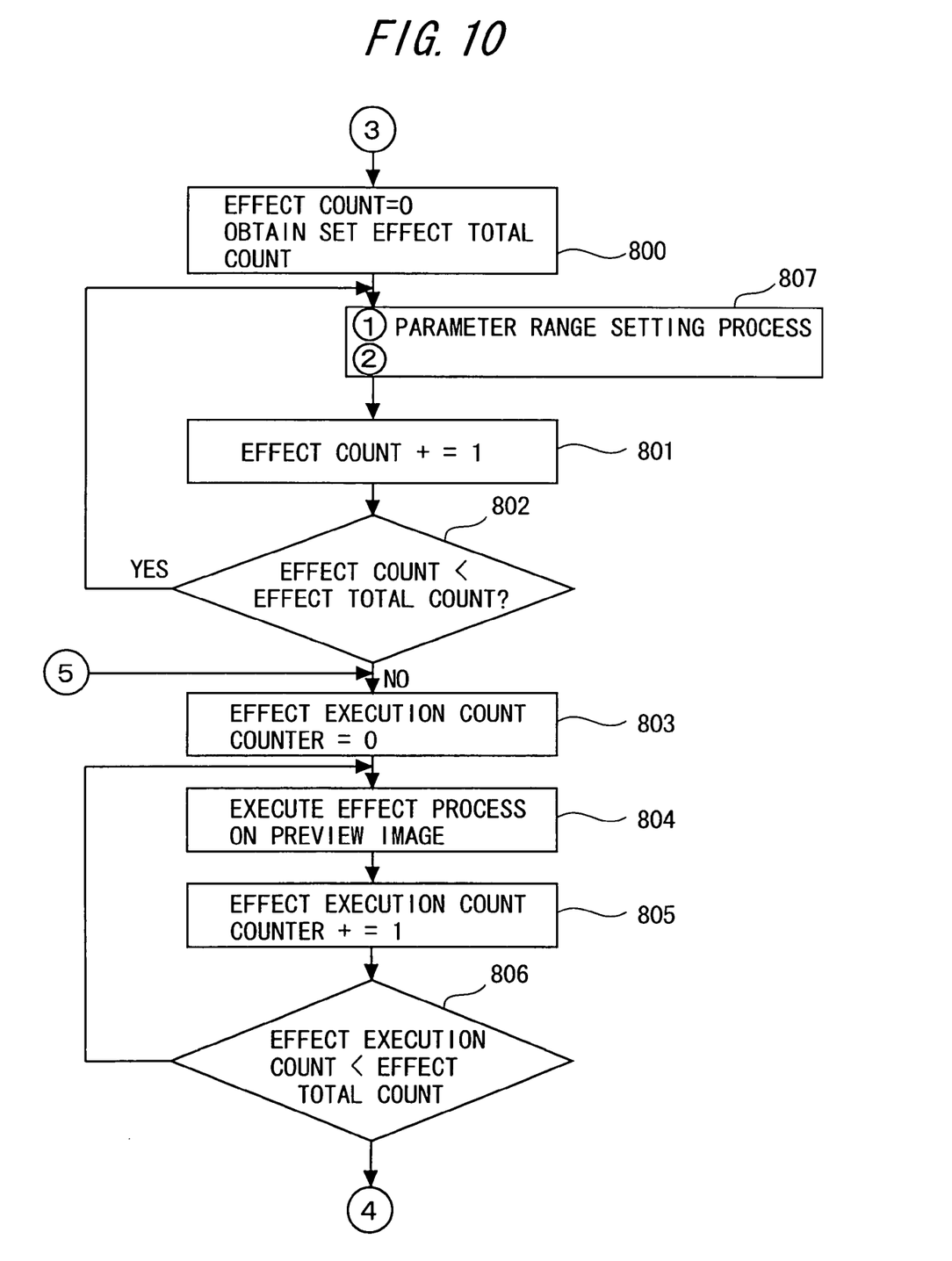
FIG. 10 is a flowchart showing a plural-category parameter range setting process in detail in the third embodiment.

FIG. 10 shows the plural-category parameter range setting process (step 709 in FIG. 9) in detail. In this process, at first, the information processing unit 102 initializes an effect count. This effect count is a variable for counting the effect count with the parameter range already set.

Further, the information processing unit 102 acquires an effect total count (step 800). This effect total count is a total count of the effects that should be applied to the image.

Next, the information processing unit 102 executes the parameter range setting process (step 807). This process is similar to the process shown in FIG. 7 in the modified example of the second embodiment.

Subsequently, the information processing unit 102 adds "1" to the effect count (step 801). Then, the information processing unit 102 judges whether the effect count (the effect count that has been already processed at the present) is less than the effect total count or not (step 802).

If the effect count is less than the effect total count, the information processing unit 102 returns the control to the plural-category parameter range setting process (step 807), and sets the parameter range of the next category of parameter.

Whereas if the effect count is equal to or larger than the effect total count, the information processing unit 102 executes the effect process on the preview image (steps 803 through 806).

In this process, to begin with, the information processing unit 102 initializes an effect execution count to "0" (step 803). The effect execution count is a variable for counting the number of parameters with the effect process executed.

Next, the effect process on the preview image is executed by use of the parameter designated by the present effect execution count (step 804).

Ensuingly, the information processing unit 102 adds "1" to a value of an effect execution count counter. Next, the information processing unit 102 judges whether the effect execution count is less than the effect total count or not (step 806).

If the effect execution count is less than the effect total count, the information processing unit 102 returns the control to the process in step 804. Then, the information processing unit 102 executes the effect process on the preview image by use of the parameter designated by the next effect execution count.

Whereas if the effect execution count is equal to or greater than the effect total count, the information processing unit 102 proceeds the control to a display process (step 703) of the preview image.

Processes (steps 704 through 708) thereafter are similar to those in the modified example (FIG. 6) of the second embodiment. In the third embodiment, however, if the stop button is not pressed (No in step 704) and if the replay time does not yet terminate (No in step 706), the information processing unit 102 proceeds the control to step 803 in FIG. 10, wherein the effect process on the preview image is repeated with each parameter added with an increment value.

As discussed above, according to the information processing system in the third embodiment, the start point and the end point can be individually set in each of the plural categories of parameters. Then, a transition of the effect process can be intuitively previewed in a way that combines the respective parameters.

<<Fourth Embodiment>>

A fourth embodiment of the present invention will be explained referring to the drawing in FIG. 11. What has been discussed in the first through third embodiments is the information processing system in which the animation with the parameter changed in time-series for the preview image is replayed, the effect is previewed in the intuitive sense of operation, and the parameter is thus set.

The fourth embodiment will deal with the information processing system that changes in time-series a parameter for setting an effect on a sound, replays the sound effect in transition and thus establishes the parameter. The fourth embodiment is thus sound-oriented and is therefore different from the first through the third image-oriented embodiments.

Hence, the fourth embodiment involves the use of the acoustic control unit 107 and the loudspeaker 108, which were not employed in the first embodiment, among the components shown in FIG. 1. Other configurations and operations are, however, similar to those in the first through third embodiments. Such being the case, the same components are marked with the same numerals, and their explanations are omitted.

Figure 11:
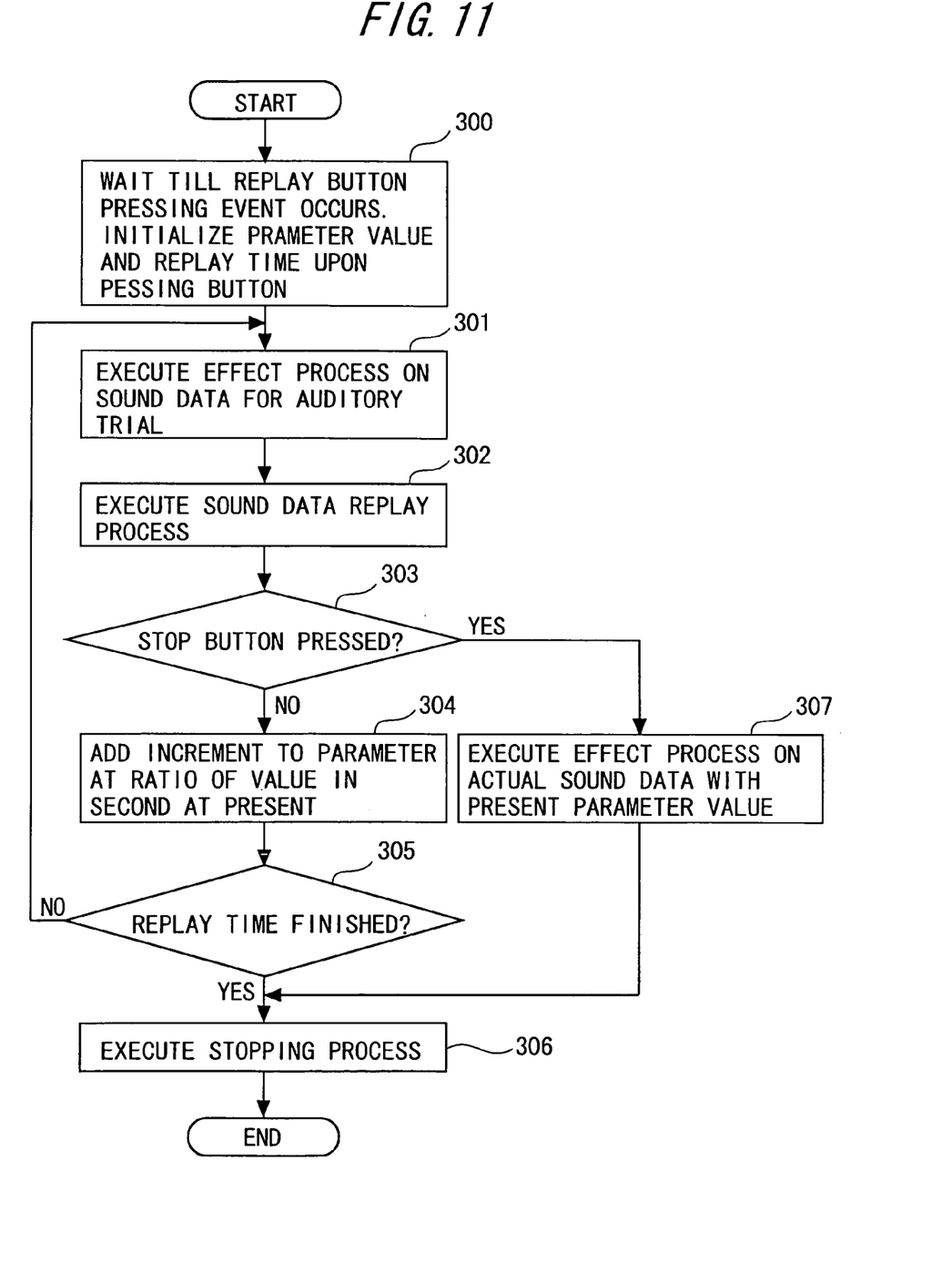
FIG. 11 is a flowchart showing a process (a parameter setting process for sound data) in the information processing system in a fourth embodiment.

FIG. 11 shows the parameter setting process executed by the present information processing system. In this process, to begin with, the information processing unit 102 waits till the event of pressing the replay button (the replay/stop button 3) occurs. Then, when the button pressing event occurs upon pressing the replay button, the information processing unit 102 initializes a parameter value and a value of the replay time (step 300).

Next, the information processing unit 102 executes the effect process on sound data for an auditory trial by use of the present parameter value (step 301). By this process, for example, a reverberation effect, etc of the sound data for the auditory trial is set in this parameter value, and the sound data are processed by the acoustic control unit 107. Then, the processed sound data are replayed by the acoustic control unit 107 and outputted from the loudspeaker 108 (step 302).

Next, the information processing unit 102 judges whether or not the event of pressing the stop button (the replay/stop button 3) occurs (step 303). If the stop button is not pressed, the information processing unit 102 calculates an increment in the parameter from an elapsed time till the present time since the start of the replay. Then, the information processing unit 102 adds the increment to the present parameter value (step 304).

Next, the information processing unit 102 judges whether the replay time terminates or not (step 305). If the replay time does not terminate, the information processing unit 102 returns the control to the effect process on the sound data for the auditory trial. Further, if the replay time terminates, the information processing unit 102 executes the stopping process (step 306).

While on the other hand, when judging in step 303 that the stop button is pressed, the information processing unit 102 executes the effect process on the actual sound data by use of the present parameter value (step 307).

In this process, the effect process on the actual sound data is executed by referring to the parameter value applied to the sound data for the auditory trial. Thereafter, the information processing unit 102 executes the stopping process (step 306).

If the user presses the OK button in the stopping process, the information processing unit 102 saves the parameter concerned and finishes the parameter setting process. Further, if the user presses the cancel button, the information processing unit 102 discards this parameter and finishes the parameter setting process.

As discussed above, according to the present information processing system, the parameter for specifying the acoustic effect can be set simply and intuitively.

<Modified Example>

What has been explained in the fourth embodiment is the function of causing the time-based variations of the effect on the sound data for the auditory trial, outputting the sound data from the loudspeaker and having the parameter optimal determined by the user's operation. The sound data for the auditory trial may involve the use of data of which a data size is decreased by reducing the sound data by a thinning process and a frequency filtering process. Then, the parameter value has been established, the effect process on the actual sound data may also be executed.

<<Readable-by-Computer Recording Medium>>

A program for making a computer actualize the function as the information processing system in each of the embodiments discussed above, can be recorded on a readable-by-computer recording medium. Then, the computer reads and executes the program on this recording medium, thereby functioning as the information processing system in each of the embodiment discussed above.

Herein, the readable-by-computer recording medium includes recording mediums capable of storing information such as data, programs, etc. electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<<Data Communication Signal Embodied in Carrier Wave>>

Furthermore, the aforementioned program can be stored in the hard disk and the memory of the computer, and downloaded to other computers via communication media. In this case, the program is transmitted as data communication signals embodied in carrier waves via the communication media. Then, the computer downloaded with this program can be made to function as the information processing system in each of the embodiments discussed above.

Herein, the communication media may be any one of cable communication mediums such as metallic cables including a coaxial cable and a twisted pair cable, optical communication cables, or wireless communication media such as satellite communications, ground wave wireless communications, wireless LANs, Bluetooth, etc.

Further, the carrier waves are electromagnetic waves for modulating the data communication signals, or the light. The carrier waves may, however, be DC signals. In this case, the data communication signal takes a base band waveform with no carrier wave. Accordingly, the data communication signal embodied in the carrier wave may be any one of a modulated broadband signal and an unmodulated base band signal (corresponding to a case of setting a DC signal having a voltage of 0 as a carrier wave).

(Industrial Applicability)

The present invention can be applied in a manufacturing industry for manufacturing information processing systems such as computers, etc., content creating systems for synthesizing or recording images and sounds, replaying systems for replaying images and sounds, a service industry for providing the images and the sounds, a picture industry, a music industry, an advertisement industry, a broadcasting industry, a communication service and so on.

What is claimed is:

1. An information processing system setting a parameter related to target data, comprising:
    an output unit outputting the target data;
    an operation unit detecting a user's indication;
    an output control unit changing a parameter value ranging from a value of a start point to a value of an end point gradually as time elapses and outputting the target data with the parameter value set, from said output unit; and
    a processing unit establishing the parameter value when detecting the user's indication as a parameter value related to the target data.

2. An information processing system according to claim 1, further comprising a speed designating unit designating a speed of changing the parameter value.

3. An information processing system according to claim 1, wherein said output control unit linearly changes the parameter value.

4. An information processing system according to claim 1, further comprising a range specifying unit inputting an initial value and an end value between which the parameter value is changed.

5. An information processing system according to claim 1, wherein said output unit simplifies and thus outputs the target data, and
    said output control unit has the simplified target data outputted based on the parameter value that is to be changed.

6. An information processing system according to claim 1, wherein the target data are image data.

7. An information processing system according to claim 1, wherein the target data are sound data.

8. An information processing method setting a parameter related to target data, comprising:
    changing a parameter value ranging from a value of a start point to a value of an end point gradually as time elapses and outputting the target data with the parameter value set;
    detecting a user's indication; and
    establishing the parameter value when detecting the user's indication as a parameter value related to the target data.

9. An information processing method according to claim 8, further comprising designating a speed of changing the parameter value.

10. An information processing method according to claim 8, wherein the parameter value is linearly changed.

11. An information processing method according to claim 8, further comprising inputting an initial value and an end value between which the parameter value is changed.

12. An information processing method according to claim 8, wherein the target data are simplified and thus outputted, and
the simplified target data are outputted based on the parameter value that is to be changed.

13. An information processing method according to claim 8, wherein the target data are image data.

14. An information processing method according to claim 8, wherein the target data are sound data.

15. A readable-by-computer recording medium recorded with a program making a computer set a parameter related to target data and execute:
changing a parameter value ranging from a value of a start point to a value of an end point gradually as time elapses and outputting the target data with the parameter value set;
detecting a user's indication; and
establishing the parameter value when detecting the user's indication as a parameter value related to the target data.

16. A readable-by-computer recording medium recorded with a program according to claim 15, further making said computer execute designating a speed of changing the parameter value.

17. A readable-by-computer recording medium recorded with a program according to claim 15, wherein the parameter value is linearly changed.

18. A readable-by-computer recording medium recorded with a program according to claim 15, further making said computer execute inputting an initial value and an end value between which the parameter value is changed.

19. A readable-by-computer recording medium recorded with a program according to claim 15, wherein the target data are simplified and thus outputted, and
the simplified target data are outputted based on the parameter value that is to be changed.

20. A readable-by-computer recording medium recorded with a program according to claim 15, wherein the target data are image data.

21. A readable-by-computer recording medium recorded with a program according to claim 15, wherein the target data are sound data.

22. A program making a computer set a parameter related to target data and execute:
changing a parameter value ranging from a value of a start point to a value of an end point gradually as time elapses and outputting the target data with the parameter value set;
detecting a user's indication; and
establishing the parameter value when detecting the user's indication as a parameter value related to the target data.

23. A program according to claim 22, further making said computer execute designating a speed of changing the parameter value.

24. A program according to claim 22, wherein the parameter value is linearly changed.

25. A program according to claim 22, further making said computer execute inputting an initial value and an end value between which the parameter value is changed.

26. A program according to claim 22, wherein the target data are simplified and thus outputted, and
the simplified target data are outputted based on the parameter value that is to be changed.

27. A program according to claim 22, wherein the target data are image data.

28. A program according to claim 22, wherein the target data are sound data.

29. A method of displaying image data or sound data sequentially adjusted based on an input parameter, comprising:
adjusting a value with respect to image data or sound data based on an input parameter ranging from a value of a start point to a value of an end point gradually, the value of the image data or the sound data being adjusted gradually in response to the input parameter; and
displaying a preview indicating a time-based adjustment of the image data or the sound data as the value thereof is adjusted gradually.

* * * * *